United States Patent [19]
Ely

[11] 3,731,769
[45] May 8, 1973

[54] FRICTION MEMBER ASSEMBLY

[75] Inventor: William Edwin Ely, Troy, Ohio

[73] Assignee: The B. F. Goodrich Company, New York, N.Y.

[22] Filed: Oct. 13, 1971

[21] Appl. No.: 188,894

[52] U.S. Cl. ...... 188/218 XL, 188/251 A, 192/107 M
[51] Int. Cl. ................................................ F16d 65/10
[58] Field of Search ................... 188/218 XL, 251 A; 192/107 R, 107 M

[56] References Cited

UNITED STATES PATENTS

| | | | |
|---|---|---|---|
| 3,376,960 | 4/1968 | Bender | 188/218 XL |
| 3,552,533 | 1/1971 | Nitz | 188/251 A |
| 2,893,519 | 7/1959 | Martin | 188/218 XL |
| 3,306,401 | 2/1967 | Dasse | 192/107 R |
| 3,365,041 | 1/1968 | Stormfeltz | 188/251 A |
| 3,410,374 | 11/1968 | Haupt | 188/251 A |

Primary Examiner—M. Henson Wood, Jr.
Assistant Examiner—John J. Love
Attorney—John D. Haney et al.

[57] ABSTRACT

An annular friction member assembly for a disc type brake or clutch having segments of heat absorbing material sandwiched between and supported by facing members of carbon composite material. The facing members have driving lugs located at positions spaced from the heat-swept area for transmitting torque forces directly from the friction surfaces of the facing members to an associated brake or clutch part. Reinforcing members are located at the driving lugs and provide additional bearing area as well as added support to the facing members of carbon composite material to prevent failure under torque loads at the fasteners holding the facing members and the segments of heat absorbing material together.

9 Claims, 5 Drawing Figures

Patented May 8, 1973

3,731,769

FRICTION MEMBER ASSEMBLY

BACKGROUND OF THE INVENTION

This invention relates to disc type brakes or clutches and particularly to the annular friction disc members which engage other friction disc members during operation of a brake or clutch. These friction disc members may have facing members with friction surfaces for engaging friction surfaces of other facing members. They may also have heat absorbing material sandwiched between the facing members and means for holding the assembly together.

In aircraft brakes where weight and space are critical limitations, beryllium has been used as the heat absorbing material because it is lightweight and has excellent heat absorbing properties at operating temperatures within a desirable range. Beryllium by itself does not have adequate frictional and wearing properties making it necessary to encase it in carriers of steel or other strong wear-resistant material. It has also been necessary to use a sintered iron friction material on the faces of the steel carriers and, as a result, a large percentage of the weight of the friction disc members is in the steel carriers and friction material.

The beryllium heat absorbing material is relatively expensive in the form of circumferentially continuous rings. With beryllium segments, substantial savings can be made in the fabrication of the parts for the friction disc members and also in providing replacement parts. It has also been found that when the stresses on beryllium are minimized due to segmentation and a configuration which eliminates mechanical stresses due to torque, the life of the beryllium parts is extended; therefore, decreasing the replacement costs.

SUMMARY OF THE INVENTION

According to this invention, an annular friction member is provided having facing members of carbon composite material for carrying the torque loads and also providing a friction surface for engagement with the friction surfaces of other disc members. Beryllium segments are sandwiched between the facing members and the whole assembly is held together by rivets which are fastened to steel reinforcing plates at the driving lugs of the facing members. The rivets extend through the reinforcing members, the facing members and the beryllium segments in an area which is spaced from the heat-swept area of the friction member. The carbon composite material and beryllium are both good heat sink materials capable of withstanding high operating temperatures. Furthermore, the beryllium absorbs generated heat at relatively low temperatures at a greater rate on a weight basis than most other materials. In addition, the structural carbon composite material has very little thermal distortion and excellent friction qualities.

The accompanying drawings show one preferred form made in accordance with and embodying this invention and which is representative of how this invention may be practiced.

DETAILED DESCRIPTION

Figures 1, 2, 3, 4, 5:
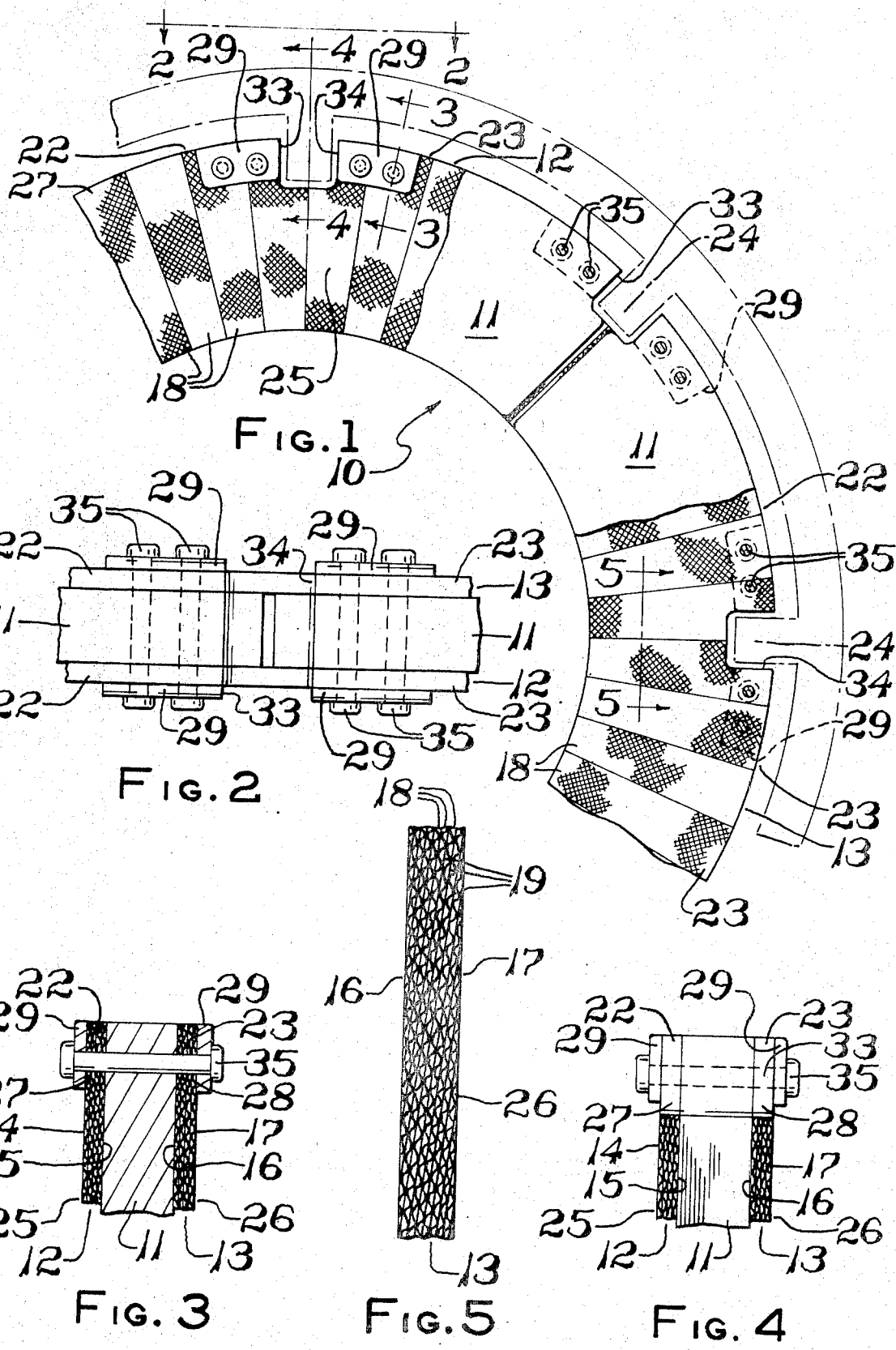
FIG. 1 is a side elevation of a part of an annular disc assembly (shown in solid lines), certain parts being broken away and illustrated in torque driving engagement with a related part which, in this example, may be a rotatable wheel, the sides of which are represented by the chain-dotted lines.
FIG. 2 is a fragmentary view of an edge of the disc assembly taken along the plane of line 2—2 of FIG. 1.
FIG. 3 is a fragmentary enlarged sectional view showing the fastening and reinforcing members taken along the plane of line 3—3 of FIG. 1.
FIG. 4 is a fragmentary enlarged sectional view showing the driving edge of the driving lug in detail taken along the plane of line 4—4 of FIG. 1.
FIG. 5 is an enlarged fragmentary sectional view of a facing member taken along the plane of line 5—5 of FIG. 1.

Referring to FIG. 1, an annular friction member assembly 10 is shown having a plurality of arcuate bodies 11 disposed in end-to-end relationship forming an annulus. The arcuate bodies 11 are preferably of a material having high heat absorbing properties such as beryllium. Preferably the annulus of arcuate bodies 11 is made up of a number of spaced-apart segments to provide for thermal expansion and ease of replacement of a portion of the annulus.

Facing members 12 and 13 overlie the arcuate bodies 11 on opposite sides of the friction member assembly 10 and are preferably circumferentially continuous annular rings of carbon composite material. Each of the facing members 12 and 13 has flat parallel faces 14 and 15, and 16 and 17 respectively, with the faces 15 and 16 abutting the arcuate bodies 11 and the faces 14 and 17 in position for frictional engagement with other brake parts; not shown.

The facing members 12 and 13 in their finished condition may be unitary annular bodies of carbon composite material which are built up from a plurality of segmental strips 18 bonded together by a bond 19 shown more clearly in FIG. 5 for facing member 13. The segmental strips 18 are of pyrolized cloth and although several different materials may be used, it has been found that rayon is satisfactory for this application. The strips 18 may be of either graphite cloth or carbon cloth. The process for making this material is well known in the art and therefore it will not be described here.

The fabric of the segmental strips 18 is usually impregnated with a high temperature thermal setting resin or other bonding material such as phenolic which is chosen for its ability to convert into carbon or graphite upon pyrolization during a later step in the manufacture of the facing members. The strips 18 may be in the form of sectors with curved sides at the inner and outer diameters respectively and each of the strips may extend circumferentially in an arc from approximately 45° to 180°.

The segmental strips 18 are laid up in a partially overlapping condition with the ends of each strip extending into opposite faces 14 and 15 of facing member 12 and faces 16 and 17 of facing member 13. By continuing the overlapping lay-up of the strips 18, an annular configuration is obtained. The bond 19 is obtained when the facing members 12 and 13 are pyrolized at which time the resin is converted to a char bond of graphite or carbon depending upon the temperatures of pyrolization. This provides facing members 12 and 13 of carbon composite material which are able to withstand high temperatures during the braking operation and also have uniform frictional surfaces for contact with the frictional surfaces of other brake parts. The material is lightweight, temperature resistant and has sufficient strength to transmit torque.

As shown in FIG. 1, the facing members 12 and 13 have driving lugs 22 and 23, respectively, at the radially outer edges for engagement with splines 24 of a wheel, shown in chain-dotted lines. The friction member assembly 10 is shown here as a rotor; however, it is understood that it may also be used as a stator in which the driving lugs are at the inner diameter for engagement with a torque tube. The driving lugs 22 and 23 are spaced radially outward from friction portions 25 and 26 of the flat faces 14 and 17 on the facing members 12 and 13 which are frictionally engaged with other brake parts during operation of the brake. In this way, the radially outer or torque transmitting portions 27 and 28 of the facing members 12 and 13, respectively, are not subject to the excessively high temperatures generated in the area of the friction portions 25 and 26 and referred to as "the heat-swept area."

In the embodiment shown, reinforcing plate members 29 extend over the radially outer edges of the friction member assembly 10 and overlie the driving lugs 22 and 23 of the facing members 12 and 13 at driving edges 33 and 34. These reinforcing members 29 are preferably of a wear-resisting metal such as steel.

Fastening means such as rivets 35 extend through the reinforcing plate members 29, the driving lugs 22 and 23 and the arcuate bodies 11 for holding the assembly 10 together. It is evident that no appreciable torque forces are transmitted through the arcuate bodies 11 which are retained in position by the rivets 35.

The facing members 12 and 13 of the structural carbon composite material described hereinabove are lightweight and not only retain the arcuate bodies 11 of beryllium in position but also have integral friction portions 25 and 26 for engagement with other friction members of the brake or clutch. This invention is not confined to the specific overlapping lay-up construction of the facing members 12 and 13 and it is understood that other constructions such as a flat lay-up laminated carbon composite material may be used for the facing members.

The manufacture of the friction member assembly 10 can be done expeditiously and with a minimum of labor by placing the segmental arcuate bodies 11 in a sandwiched relationship between the facing members 12 and 13, placing the reinforcing plate members 29 over the radially outer faces of the assembly and placing the rivets 35 in position extending through the driving lugs 22 and 23, the arcuate bodies 11 and the reinforcing plate members 29. Disassembly for maintenance purposes can also be accomplished with ease requiring only that the rivets 35 be ground off and removed to replace facing members 12 and 13 and any or all segmental arcuate bodies 11 that may require replacement.

In operation of the friction member assembly 10, the friction portions 25 and 26 of the flat parallel faces 14 and 17 are moved axially into frictional engagement with other brake parts resulting in torque forces on the facing members 12 and 13. These forces are transmitted through the driving edges 33 and 34 of the driving lugs 22 and 23 and through the edges of arcuate bodies 11 in engagement with the splines 24. The arcuate bodies 11 and facing members 12 and 13 are in position to absorb large quantities of heat; however, the thermal distortion which may occur will be held to a minimum because of the segmental nature of the annulus. Furthermore, the rivets 35 connecting the arcuate bodies 11 with the facing members 12 and 13 are located outside the heat-swept area in an area where the thermal distortion is at a minimum and this results in greater wear resistance and a longer life of the assembly 10.

These results are obtained with facing members 12 and 13 of a composite carbon material capable of withstanding very high temperatures. This is especially desirable for aircraft where large quantities of heat must be absorbed by the friction member assembly 10 while at the same time the weight of the assembly must be kept to a minimum and it must fit in a very limited space.

I, therefore, particularly point out and distinctly claim as my invention:

1. An annular friction member assembly for a brake or clutch mechanism comprising a plurality of arcuate segmental bodies of heat absorbing material spaced apart around the annular friction member assembly, annular circumferentially continuous facing members overlying said arcuate segmental bodies, said facing members being made of carbon composite material, friction portions of said facing members located in a heat-swept area, torque transmitting portions of said facing members radially spaced from said friction portions and fastening means connecting said facing members to said arcuate segmental bodies at said torque transmitting portions.

2. An annular friction member assembly according to claim 1 wherein reinforcing members overlie said facing members in a supporting relationship with said fastening means.

3. An annular friction member assembly according to claim 2 wherein said fastening means are rivets extending through and connecting said reinforcing members, facing members and arcuate bodies.

4. An annular friction member assembly according to claim 3 wherein said facing members have driving lugs with edges in torque transmitting relationship with other brake parts and a pair of said reinforcing members disposed at said each of edges for distributing the stresses over said torque transmitting portion of said facing members.

5. An annular friction member assembly according to claim 4 wherein said reinforcing members are plates of steel overlying the faces of said facing members on both sides to provide added support to said facing members and additional bearing area to prevent failure from torque forces transmitted by said facing members.

6. An annular friction member assembly for a brake or clutch mechanism comprising a plurality of arcuate bodies of heat absorbing material, facing members overlying said arcuate bodies, said facing members being made of laminations of sheets of pyrolized cloth and carbonaceous filler material, friction portions of said facing members located in a heat-swept area, torque transmitting portions of said facing members radially spaced from said friction portions and fastening means connecting said facing members to said arcuate bodies at said torque transmitting portions.

7. An annular friction member assembly according to claim 6 wherein said sheets of pyrolized cloth and filler material are circumferentially extending strips laid up in overlapping relationship with one end of each strip forming a portion of one face of said facing member and the other end of said strip forming a portion of an opposite face of said facing member.

8. An annular friction member assembly according to claim 6 wherein said heat absorbing material of said arcuate bodies is beryllium having high heat absorbing properties in relation to weight.

9. An annular friction member assembly according to claim 8 wherein reinforcing members of high strength metal overlie said facing members and are in engagement with said fastening means for providing increased bearing area and added support to said facing members.

* * * * *